Oct. 25, 1966  C. W. SOLTIS  3,280,541
FILTER CELL AND RETAINING ASSEMBLY
Filed March 3, 1964

Inventor
Charles W. Soltis
By Edward L. Amonette
Agent

3,280,541
FILTER CELL AND RETAINING ASSEMBLY
Charles W. Soltis, Albuquerque, N. Mex., assignor to Envirco, Inc., Albuquerque, N. Mex., a corporation of New Mexico
Filed Mar. 3, 1964, Ser. No. 349,005
2 Claims. (Cl. 55—483)

My invention relates to filter systems, and more specifically to the installation of filters into a supporting frame. Its greatest value is when used with absolute filters, i.e., those filtering out 99.97% of all air-borne particles of 3/10 micron diameter or larger, but it also finds wide application with filters of lesser efficiency.

In my previous patent application, Supporting and Sealing Means for Filters, Serial Number 293,597, filed July 19, 1963, I have summarized previous methods and means of installing absolute filters. That application is concerned with filter cells of the prior art, wherein filter media is surrounded by a heavy flanged metal frame having a flat gasket around its upper edge. These cells are heavy and expensive, making it a wasteful operation to change cells, since the heavy metal frame must be thrown away along with the clogged filter media. The flat gasket which has been furnished as part of the older cell requires a high sealing force because of its great contact area. The metal frame must be air tight at all its joints, making it difficult and expensive to manufacture. Another problem associated with prior cells is that of protecting the filter media from damage during use. When the cells are installed in a bank forming the side or ceiling of a clean room, manufacturing activities within the room are very apt to force equipment into the relatively fragile filter media. Therefore it has been necessary to install a separate metal screen over the filter cells, usually by means of screws. Thus, when it is time to change a cell the operation has been more complicated by the fact that the screen must be removed separately, and by the fact that most frequently the screen covers more than one cell.

In my invention I have greatly reduced the weight and expense of the filter cell by providing a lightweight molded plastic frame surrounding and sealed to the filter media. This frame has a peripheral flange which is grooved in its upper side for supporting a gasket having its free surface rounded. A separate open frame, preferably made of substantially non-deformable metal, encompasses the filter cell and is removable therefrom. This open frame has at its upper edge a peripheral flange which bears against the flange of the plastic frame from beneath. An integral part of each open frame is a protective screen fastened to its lower edge.

When the filter media of the present invention becomes dirty and requires replacement it is a simple matter to remove the filter cell, open frame and screen as a unit and discard the lightweight and inexpensive filter cell. Then a new cell is inserted in the open frame and the assembly is reinstalled.

My present invention is so designed that it is usable in the place of the older type filter cell, and may be supported and sealed by my invention shown and described in the previously referenced patent application, although it is not limited to use therewith.

A better understanding of my invention may be had by reading the more detailed description to follow in conjunction with the appended claims and the attached drawing, in which:

Figure 1:
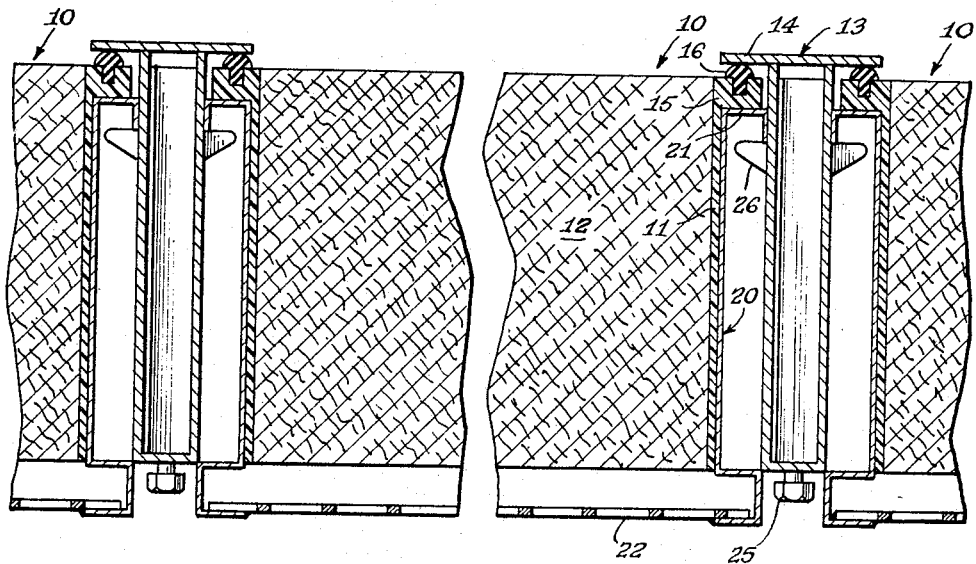
FIG. 1 is a cross sectional view of my preferred embodiment of my invention installed in a supporting frame.
Figure 2:
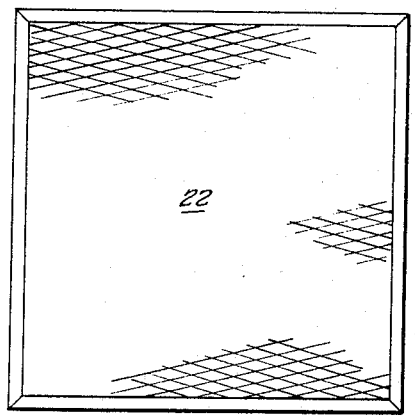
FIG. 2 is a bottom plan view of the same embodiment, showing the protective screen.
Figure 3:
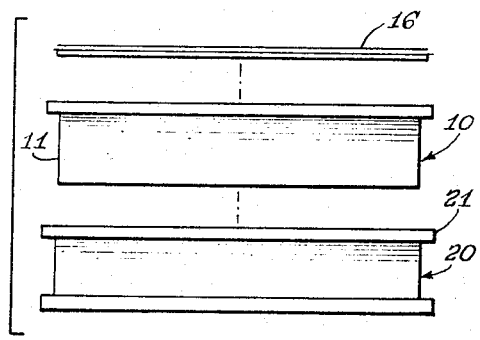
FIG. 3 is an exploded edge view of the embodiment.

Referring now to the drawing, a plurality of absolute filter cells 10, each consisting of a molded plastic frame 11 sealably enclosing filter media 12, are seen mounted in supporting frame 13 which includes a structural member of generally rectangular hollow cross section with a top flange or stop 14. The structural member thus forms an element of generally T-shaped cross section to limit upward movement of the absolute filter cell 10.

Since plastic frame 11 is molded in one piece there are no joints to leak unfiltered air. Flange 15 is an integral part of the filter cell, and is grooved on its upper surface to receive gasket 16. The gasket has a rounded free surface for sealably engaging the lower surface of stop 14 with a minimum of contact area, and hence a minimum of force.

Open frame 20 removably encompasses filter cell 10 with flange 21 extending around its periphery and bearing against flange 15 from beneath. Screen 22 is permanently attached to the lower edge of open frame 20, furnishing a protective covering for relatively fragile filter media 12.

Mounted within the hollow vertical portion of supporting frame 13 is a bolt 25 which operates to retract toggle 26 in a manner explained in the previously referenced patent application, when it is desired to remove the filter cell. Turning of bolt 25 in the opposite direction increases the force of toggle 26 against flange 21, forcing gasket 16 into a sealing engagement with stop 14.

When it is desired to replace filter cell 10 the toggles are retracted as previously explained, to allow the filter cell and retaining assembly to be removed from the supporting frame. Then cell 10 is easily separated from within open frame 20 so that it can be replaced with a new cell. During installation of the filter cell and retaining assembly, and use thereafter, screen 22 protects the filter media from damage. Open frame 20, which is the heavy and expensive portion of the assembly, is retained for continued use with a series of filter cells, thus providing a long term economy. The filter cell itself, being partially a plastic molding, is a relatively inexpensive item compared to the filter cells of prior art.

Although I have shown my invention in the form of a preferred embodiment retained and sealed by means of another invention of mine, it will be obvious to those skilled in the art that the present invention is not limited to such use. It is a useful device also when used with other supporting and sealing means of the prior art, and the embodiment shown is capable of modification without departing from the sphere and scope of the present invention as defined in the claims below.

I claim is my invention:

1. A filter cell system comprising a filter cell comprised of a filter media and a filter frame including a horizontally extending flange, said flange being provided with a peripherally extending groove on the upper surface thereof and means forming a sealing surface comprising a gasket having a section disposed in said groove, and a peripherally extending wall depending substantially perpendicularly from the inner edge of said flange in a direction away from said upper surface, said filter frame substantially enclosing the filter media and being in substantially fluid tight relationship therewith, said flange having a supporting surface on the side adjacent said wall and opposite said sealing surface; a supporting frame having a web and a flange presenting a sealing surface for the sealing surface of said filter frame and extending laterally from one end of said web and defining at least one opening of predetermined configuration, a filter cell open frame supported by said supporting frame and having a horizontally extending flange having an upper surface in contact with said supporting surface of said filter frame flange and supporting the filter cell in said opening which is of corresponding configuration, said open frame having a peripherally extending wall depending substantially perpendicularly from the inner edge of said flange in a direction away from said upper surface, said wall surrounding the periphery of said filter frame and being in contact therewith, said supporting frame including latching means for releasably latching and engaging surfaces of said open frame and for advancing said open frame towards the flange of the supporting frame to shift the flange of said filter cell and sealing surface thereon into intimate contact with the flange of the supporting frame to seal the junction therebetween, said latching means including means operable to release said open frame and the filter cell supported thereby from said supporting frame to permit removal and replacement of the filter cell relative to the open frame, said open frame being formed with a depending portion on said peripherally extending wall, and a perforated screen supported by said depending portion for protecting said filter cell.

2. The invention in accordance with claim 1 wherein the filter cell frame is made of lightweight deformable plastic and said open frame is substantially rigid and non-deformable.

References Cited by the Examiner
UNITED STATES PATENTS

| | | | |
|---|---|---|---|
| 971,895 | 10/1910 | Joedicke | 55—493 |
| 1,895,642 | 1/1933 | Preble | 55—483 X |
| 1,961,445 | 6/1934 | McCormick | 55—504 X |
| 2,062,649 | 12/1936 | Hegan | 55—484 X |
| 2,214,750 | 9/1940 | Myers | 55—483 X |
| 2,792,906 | 5/1957 | Evans | 55—483 X |
| 3,142,550 | 7/1964 | Kuehne. | |
| 3,183,286 | 5/1965 | Harms | 55—497 X |

ROBERT F. BURNETT, *Primary Examiner.*